United States Patent [19]

Morin

[11] 3,747,368

[45] July 24, 1973

[54] DOUBLE UNIVERSAL JOINT
[75] Inventor: Gerard Morin, Bondy, France
[73] Assignee: Societe Anonyme DBA
[22] Filed: Dec. 10, 1971
[21] Appl. No.: 177,752

[30] Foreign Application Priority Data
Sept. 11, 1970 France .............................. 7033025

[52] U.S. Cl. .......................................... 64/21, 64/8
[51] Int. Cl. ............................................. F16d 3/30
[58] Field of Search ........................... 64/21 R, 8 R

[56] References Cited
UNITED STATES PATENTS
3,324,683   6/1967   Schroter .................................. 64/21
2,067,286   1/1937   Pearce ..................................... 64/21
3,017,755   1/1962   Miller ...................................... 64/21
1,665,241   4/1928   Weiss ...................................... 64/21

FOREIGN PATENTS OR APPLICATIONS
994,934   11/1951   France .................................... 64/21

Primary Examiner—Charles J. Myhre
Assistant Examiner—Randall Heald
Attorney—Ken C. Decker

[57] ABSTRACT

Double universal joint in which the conventional slidable ball and socket joint embodying the bending centre of the joint is replaced by an articulation comprising a spherical gearing. This articulation allows the bending centre to remain equally distant from each end of the joint irrespective of the bending angle, thus giving a perfect constant-velocity feature to a double Cardan joint. The articulation can be inexpensively manufactured by cold forging.

2 Claims, 5 Drawing Figures

DOUBLE UNIVERSAL JOINT

This invention relates to double universal joints and more particularly relates to a joint in which the conventional ball and socket at the centre of the joint is replaced by an improved multi-directional articulation.

Universal joints are well-known torque transmitting means used, for example, in motor vehicle construction. They can tranmit the rotation of a driving shaft to a driven shaft while allowing these shafts to "bend", i.e. to move out of positional alignment. It is well known to use double universal joints which when large "bending" angles are to be obtained. In conventional Cardan type joints, it is well known that a combination of two of these joints will correct a rotational irregularity which is particularly pronounced when a single joint is used.

A cardan type of double joint will not, however, provide a constant velocity transmission since the primary and secondary shafts will rotate in perfect synchronism only if both of the elementary joints forming the double joint have an equal bending angle, and this implies that the shafts must have an inclination such that their axes meet at a point equally distant from each of the bending centres. The arrangement generally adopted for ensuring that this condition is approximately satisfied comprises connecting members which are disposed in alignment with the shafts and which are coupled to each other by a sliding ball and socket joint. The latter transmits no torque and serves only as a point of support ; sliding of this ball and socket joint is intended to absorb the difference in length experienced by one of the connecting members when the bending angle is varied. It will be apparent that the conventional use of a sliding ball and socket joint will not give a constant velocity transmission because it does not allow the two bending centres to be systematically equidistant from the point of intersection of the shaft axes.

It is known to use sliding ball and socket joints in a similar arrangement in types of double universal joint other than those which include Cardan transmission couplings. When sliding ball and socket joints are used in constant velocity double joints, the variations due to the sliding of the ball and socket joint do not destroy the constant velocity feature of the double joint but they do prevent the use of certain advantageous arrangements which would allow dimensions to be reduced.

The sliding ball and socket joint is always a relatively complex component because it requires spherical machining and, in particular, the machining of a spherical recess covering a solid angle of more than 180°.

The present invention provides a double universal joint wherein the sliding ball and socket joint is advantageously replaced by an improved articulation. The invention also covers this improved articulation.

In the double universal joint according to the invention, the articulation which replaces a sliding ball and socket joint is formed by two adjacent heads, the confronting surfaces thereof respectively comprising at least one annular depression and at least one annular projection which, in axial section, have the profile of gearing teeth, the projections on one of the heads being received in the depressions in the other head and forming a spherical gearing system in which at least two adjacent teeth are in contactive engagement for any bending angle within a given solid angle.

The resulting articulation has none of the disadvantages of a ball and socket joint, because the two heads of this articulation roll on one another in every direction in the same way as two gear sectors roll on one another in a single direction, and hence with equal angles of rotation when the vector radii are equal and the centres of rotation are fixed. In addition, the articulation is relatively inexpensive, because it can be made by cold forging with sufficiently narrow tolerances to make any subsequent machining unnecessary. This articulation can therefore be used advantageously in all types of double universal joints.

The invention will now be described by way of example with reference to the accompanying drawings wherein :

FIG. 1 illustrates a conventional Cardan type double joint to which reference will be made in order to explain the object of the invention.

A double joint of this type is reversible; the components on the primary side are similar to the components on the secondary side and have the same references.

It will be apparent that the head T of each of the shafts A is mounted pivotally on a cross-member or spider K. The two spider members K are themselves pivotable relatively to a cage C holding them in spaced relationship. The joint consequently permits each of the shafts A to oscillate in two mutually perpendicular directions and it also permits a rotational movement to be transmitted from one shaft to the other.

Two rods P connected to the shafts A via the shaft heads T extend within the cage C and in alignment with the shafts A. The free ends of the rods P are coupled to one another by a sliding ball and socket joint R. The ball and socket joint R causes each of the shafts A to assume the inclination $\alpha$ or $\beta$ with respect to the aligned position of these shafts. The angles $\alpha$ and $\beta$ are equal when the centre of the ball and socket joint R is equally distant from the centre of each of the spider members K and, when this condition is satisfied, the rotational movement of one shaft is transmitted integrally to the other shaft. On the other hand, when angle $\alpha$ is not equal to angle $\beta$, the rotational movement is transmitted with some fluctuation in rotational velocity.

Figure 1:
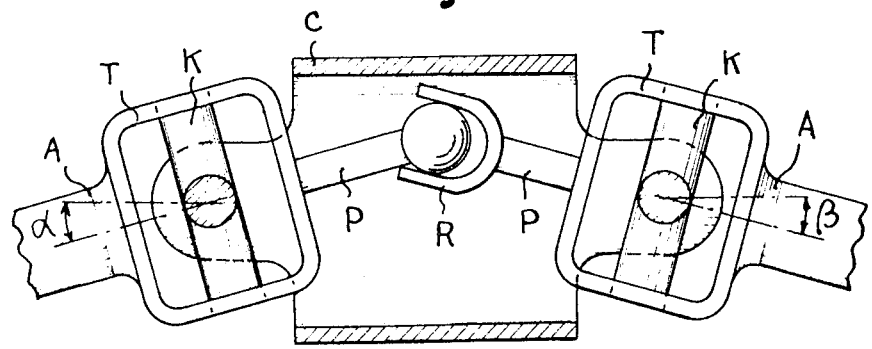
FIG. 1 shows a Cardan type double joint of conventional used, to define the object of the invention.

The conventional Cardan type double joint shown in FIG. 1 has not a perfect constant velocity feature, because the centre of the sliding ball and socket joint R does not remain equally distant from the spider members K when the inclination of the shafts varies, thus causing the angles $\alpha$ and $\beta$ to be generally unequal.

The object of the invention is to replace the sliding ball and socket joint R by an articulation which allows the angles $\alpha$ and $\beta$ to remain equal, irrespective of the inclination of the shafts.

Figure 2:
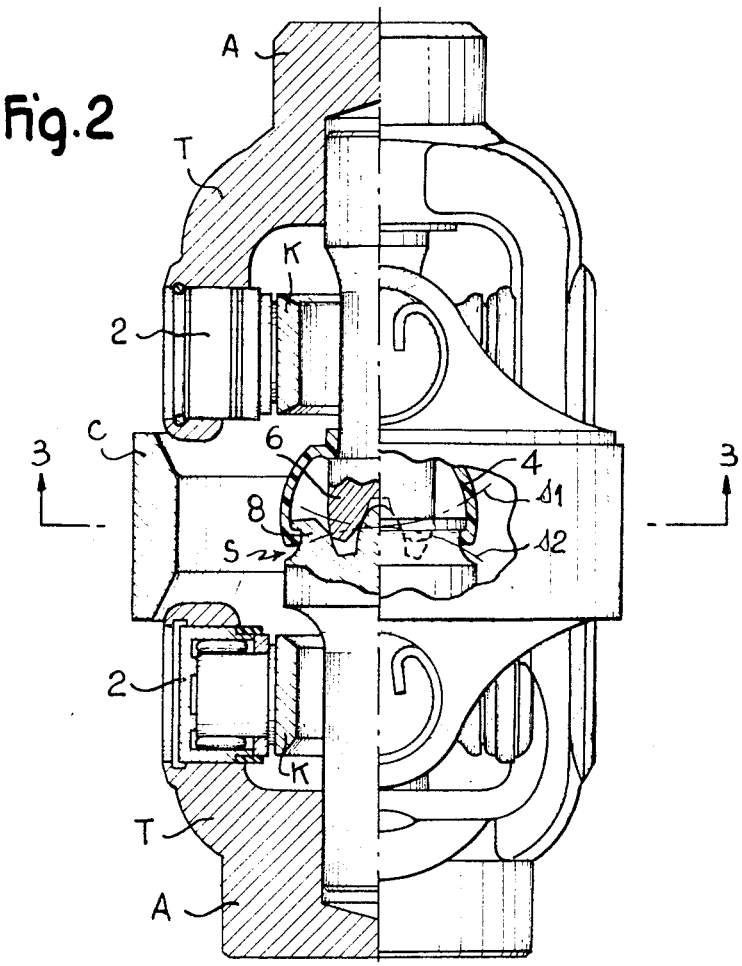
FIG. 2 is an elevation in partial section and partial broken-away form, showing a Cardan type double joint using the articulation according to the invention.

FIG. 2 illustrates a Cardan type double joint wherein the sliding ball and socket joint is replaced by an articulation according to the invention, this articulation being generally designated by the letter S. The construction of this double joint is fundamentally the same as that of the double joint shown in FIG. 1 and like parts are designated by the same numeral references. FIG. 2 includes various details which will not be described because they are well-known and do not directly relate to the invention; for example, the bearings 2 which serve as pivots for the spider members K will not be described.

The extensions P of the shafts A are fitted into the heads T of these shafts ; they extend through a central aperture in the spider members K and then are connected to the articulation S. This articulation is enclosed in a flexible protective envelope 4 which if desired may contain a lubricant.

Figure 3:
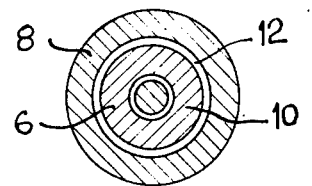
FIG. 3 is a section of the articulation on the line 3—3 in FIG. 2.

Referring to FIGS. 2 and 3, the articulation S is formed fundamentally from two parts 6, 8 whose cross section is circular and whose axial section has the profile of gear teeth, one of the elements, i.e., 6 having an annular projection 10 which is received in an annular groove 12 in the element 8. As shown, the element 6 comprises two teeth and the element 8 three. The profile of the gear teeth referred to may be a conventional profile of involute form. With this articulation, the shaft extensions P can bear on one another while moving angularly in every direction and over solid angles as great as the bending angles which are obtainable with a sliding ball and socket joint.

Using the articulation S according to the invention, the Cardan type double joint shown in FIG. 2 is a constant velocity joint because, irrespective of the inclination of the shafts A, the contact points of the elements 6, 8 are situated on pitch circles $s1$, $s2$ which define the gearing. Provided that circles $s1$, $s2$ have an equal radius and their centre coincides with the centre of the spider members K, the axes of the shafts A always intersect in the central plane 3—3. The point of intersection of the axes is therefore always equidistant from the centres of the spider members K and the two shafts are always equally inclined.

Figure 4:
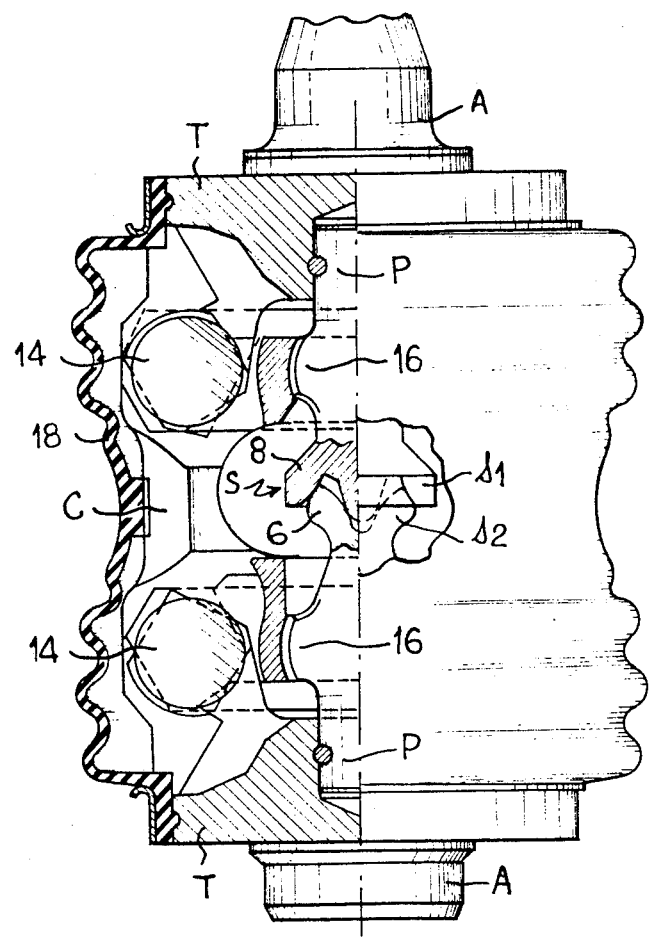
FIGS. 4 and 5 are elevations, partially in section and partially broken away, of double constant velocity joints using the articulation according to the invention.

FIG. 4 shows a modification of the invention wherein the articulation is used in a double joint formed from the constant velocity elementary joints of the type having two interlaced arms and four balls.

In the double joint, the arms of each head T are interlaced with two arms carried by the cage C, and the balls 14 are interposed between the arms. The centres of the four balls belonging to each elementary joint, hence the centre of rotation of the joint, are always contained in the same plane, irrespective of the inclination of the shafts.

The rods P are connected to an articulation S of the same type as that designated by the same reference in FIG. 2. Each of the rods P is, however, articulated on a ball and socket joint 16 in which a spherical part is integral with the rod P, a concave part is connected to the rod C, and a bending centre coincides with the centre of rotation of the joint. The double joint is surrounded by a flexible protective envelope 18.

In the case of the double joint shown in FIG. 4, the advantage of the articulation S does not lie in the fact that the shafts A retain an equal inclination, because the constant velocity feature inherent in each elementary joint exists for the entire joint irrespective of the inclination of the shafts. The double joint simply allows larger bending angles to be obtained.

Even so, it is advantageous to use the articulation according to the invention because it is cheaper than the sliding ball and socket joint which was hitherto used instead. Both the element 6 and the element 8 are readily ejected and can be made with excellent accuracy by cold forging.

Figure 5:
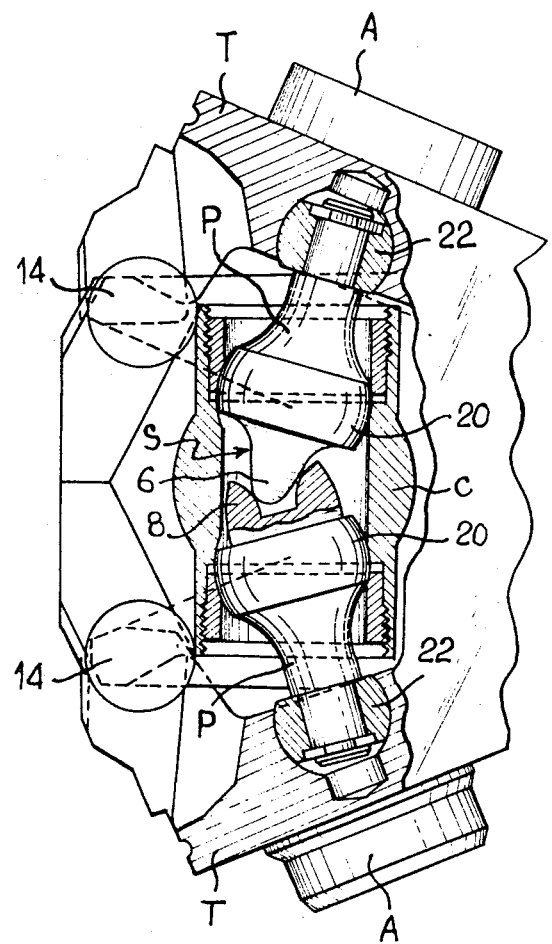

FIG. 5 illustrates an alternative embodiment of the double joint formed from two constant velocity elementary joints of the type having two interlaced arms and four balls.

In this variant, each of the rods P is articulated on a ball and socket joint 20, the centre of which is located within the space defined by the planes intersecting the four balls 14 of either elementary joint i.e., interiorly with respect to the centre of rotation of the corresponding elementary joint. Interiorly with respect to the centre of rotation of each joint, each rod P is connected to a head T by a flexible connection 22 which is shown as a ball and socket joint in the drawing but which could as well be a resilient sleeve. As before, the rods P are connected to an articulation S which forms a spherical gearing, and it will be noted that in this embodiment the element 6 of the articulation has just one tooth and the element 8 has two teeth.

The embodiment shown in FIG. 5 eliminates a need which in the case of FIG. 4, demanded that the centre of the ball and socket joints 16 should coincide with the centre of rotation of each elementary joint. As a result there are variations in the alignment between the rods P and the shafts A, but these variations are absorbed by the flexible connections 22 provided between the rods P and the heads T.

As previously described, the articulation S forms a spherical gearing system on which the rods P can bear under conditions such that — irrespective of the angle formed by the rods within the permitted limits — the axes of these rods will meet a point equally distant from the centre of rotation of the rods, said centre of rotation being embodied by the centre of the joints 20.

I claim

1. A double universal joint in which a first elementary joint and a second elementary joint each comprise an input element and an output element, the assembly of which allows a torque to be transmitted while enabling said elements to pivot independently in any direction about a center of rotation, an element of the first elementary joint being connected to an element of a second elementary joint by a single hollow member or cage, while the other element of each elementary joint is simultaneously connected to a shaft end and to a support rod, said support rod extending within the space inside the said cage and being interconnected approximately at the center of said space by means of a multi-directional articulation, said double universal joint being characterized in that the multi-directional articulation is formed by two adjacent heads, the confronting surfaces thereof respectively comprising at least one annular depression and at least one annular projection which, in axial section, have the profile of gearing teeth, the projection on one of the heads being received in the depressions in the other head to form a spherical gearing system in which at least two adjacent teeth are in contactive engagement for any relative inclination of the support rods at an angle within a given solid angle;

said first and second elementary joints being constant-velocity joints having two interlaced arms and four balls, and further characterized in that each support rod is connected to one of said joint elements rigidly and coaxially to the shaft connected to the same element, the rod being further articulated on said cage by a ball and socket joint at the location of the center of rotation of the corresponding elementary joint.

2. A double universal joint in which a first elementary joint and a second elementary joint each comprise an input element and an output element, the assembly of which allows a torque to be transmitted while enabling said elements to pivot independently in any direction about a center of rotation, an element of the first elementary joint being connected to an element of a second elementary joint by a single hollow member or cage, while the other element of each elementary joint is simultaneously connected to a shaft end and to a support rod, said support rod extending within the space inside the said cage and being interconnected approximately at the center of said space by means of a multi-directional articulation, said double universal joint being characterized in that the multi-directional articulation is formed by two adjacent heads, the confronting surfaces thereof respectively comprising at least one annular depression and at least one annular projection which, in axial section, have the profile of gearing teeth, the projection on one of the heads being received in the depressions in the other head to form a spherical gearing system in which at least two adjacent teeth are in contactive engagement for any relative inclination of the support rods at an angle within a given solid angle;

said first and the second elementary joints being constant-velocity joints having two interlaced arms and four balls, and further characterized in that each support rod is connected to one of said joint elements by a flexible connection and exteriorly with respect to the center of rotation of the corresponding elementary joint, the rod also being articulated on said cage by a ball and socket joint inside the center of rotation.

* * * * *